United States Patent [19]

Botton et al.

[11] Patent Number: 4,603,036

[45] Date of Patent: Jul. 29, 1986

[54] PROCESS FOR TREATMENT OF A GAS STREAM CONTAINING NITROGEN OXIDES

[75] Inventors: Roger M. Botton, Lyons; Jacques M. Roiron, Ternay, both of France

[73] Assignee: Rhone-Poulenc Chimie de Base, France

[21] Appl. No.: 651,816

[22] Filed: Sep. 18, 1984

[30] Foreign Application Priority Data

Sep. 21, 1983 [FR] France ................ 83 14984

[51] Int. Cl.$^4$ ............... C01B 21/00; C01B 21/40; C01B 21/44; C01B 21/46

[52] U.S. Cl. ..................... 423/235; 423/393; 423/394

[58] Field of Search ............ 423/235, 235 D, 239, 423/239 A, 393, 394

[56] References Cited

U.S. PATENT DOCUMENTS

| | | | |
|---|---|---|---|
| 3,137,542 | 1/1961 | Lerolle | 23/157 |
| 3,991,167 | 11/1976 | Depommier et al. | 423/393 |
| 4,145,399 | 3/1979 | Nagaoka et al. | 423/235 |
| 4,208,391 | 6/1980 | Endo et al. | 423/235 |
| 4,276,276 | 6/1981 | Van Hook et al. | 423/235 |
| 4,309,396 | 1/1982 | Herbrechtsmier et al. | 423/393 |
| 4,341,747 | 7/1982 | Downey | 423/235 |
| 4,372,935 | 2/1983 | Bottom et al. | 423/393 |
| 4,419,333 | 12/1983 | Reus et al. | 423/394 |

FOREIGN PATENT DOCUMENTS 50-39275 4/1975 Japan ................ 423/235

Primary Examiner—Gregory A. Heller
Attorney, Agent, or Firm—Finnegan, Henderson, Farabow, Garrett & Dunner

[57] ABSTRACT

An oxido-reduction process for nitrogen oxides contained in a gas stream also containing oxygen, in a countercurrent gas-liquid contact device. In this process, (a) for values of the ratio $NO/NO_2$ greater than 1, in that section of the gas-liquid device where the $NO_x$ content in the gas stream is less than about 6000 vpm, the ratio K, which is the ratio of the liquid retention volume in $m^3$ to the flow rate of the gas stream in $Nm^3$/hour, is increased so that the $NO_x$ are preferentially absorbed according to the reaction: $NO + NO_2 + H_2O \rightarrow 2HNO_2$ (liquid phase); and (b) oxidation is then induced, to reduce the value of the ratio $NO/NO_2$ and to restore the conditions of stage (a).

Figure 1:
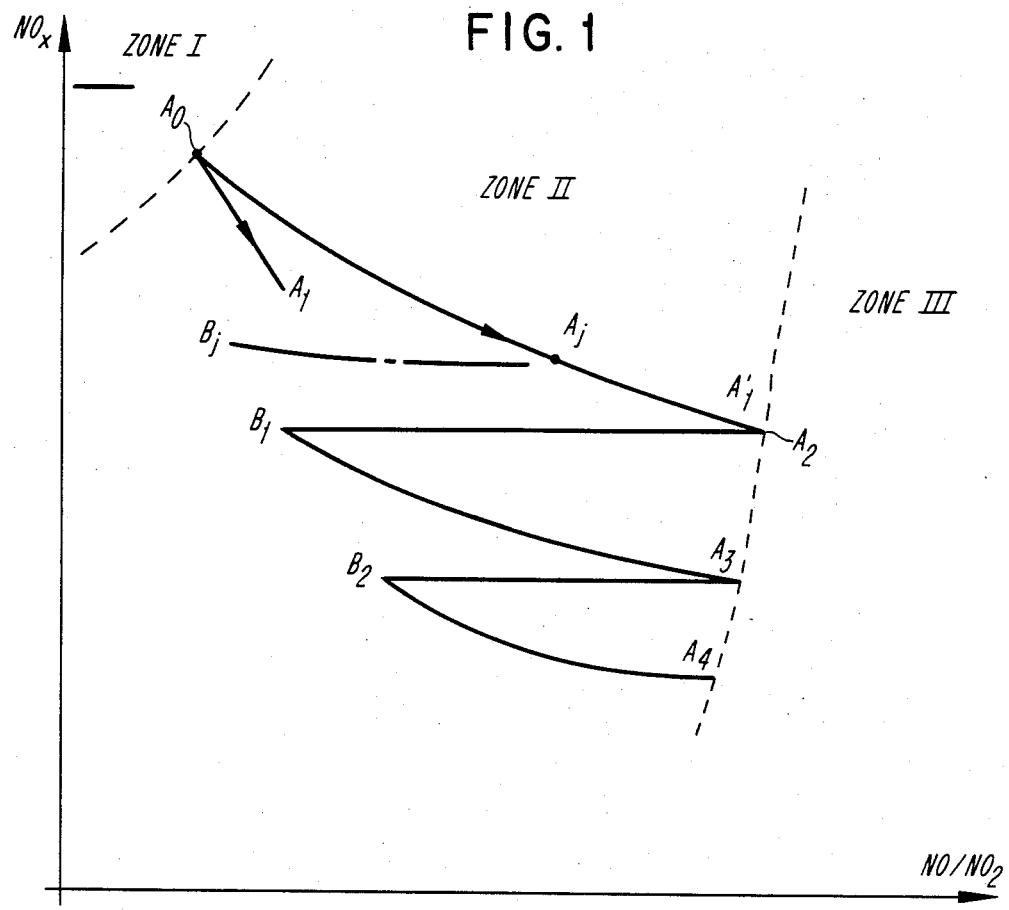

In practice, the operating point describes a curve $A_0A_2B_1A_3B_2A_4$, as shown in FIG. 1.

7 Claims, 5 Drawing Figures

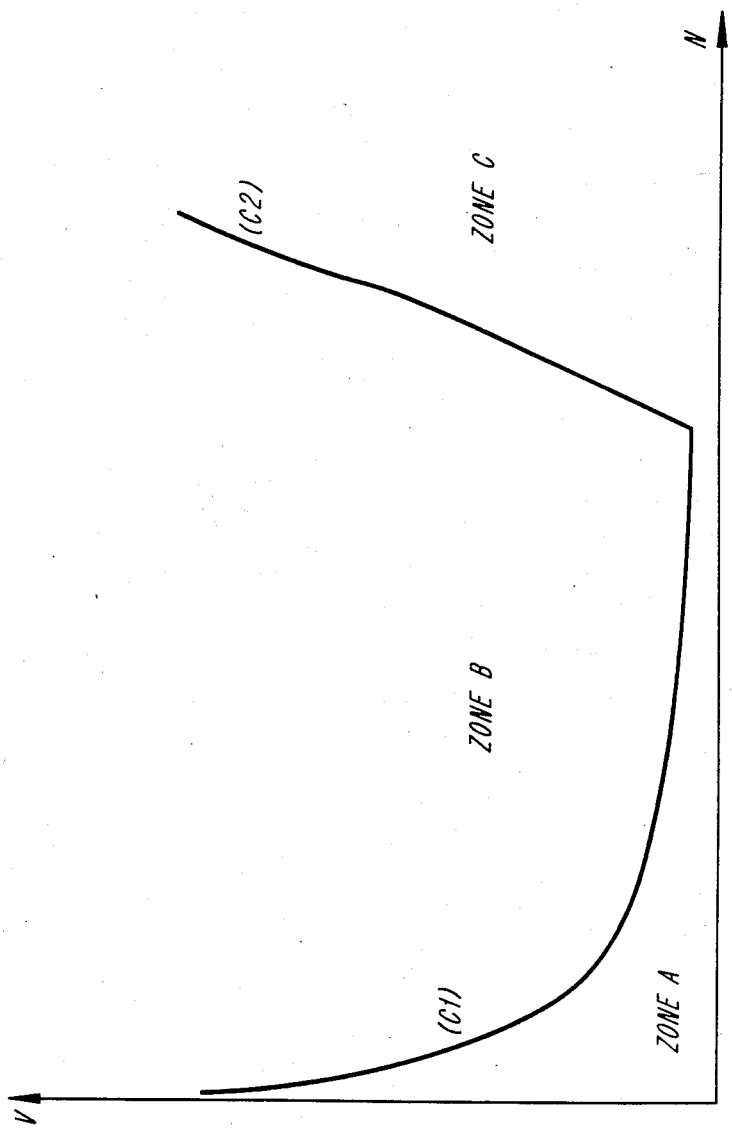

PROCESS FOR TREATMENT OF A GAS STREAM CONTAINING NITROGEN OXIDES

The present invention relates to a process for treatment of a gas stream containing nitrogen oxides and oxygen. It relates more particularly to the separation of the nitrogen oxides from the gas stream containing them and to the application of this process to the purification of residual gases.

For a long time, workers have sought to remove the nitrogen oxides originating in the manufacture of nitric acid, by passing these oxides through plate columns which form an absorption/oxidation system.

Thus, French Patent No. 1,255,373, incorporated by reference herein, and U.S. Pat. No. 3,137,542 incorporated by reference herein, recommend improvement of the efficiency of absorption columns by reducing the spacing between the first plates and, in contrast, increasing the spacing between the last plates.

This process was based on the assumption that, in the first plates, the exchange took place between gases rich in nitrogen oxide and liquid rich in nitric acid, whereas the last plates received gas depleted in nitrogen oxide and a liquid of either low nitric acid content or pure water.

This design implied that the operation of a column rests on the following two fundamental reactions:

oxidation in the gaseous phase between the plates $$NO + \tfrac{1}{2}O_2 \rightarrow NO_2$$

absorption of the $NO_2$ on the plate $$3\,NO_2 + H_2O \rightleftarrows 2\,HNO_3 + NO$$

This resulted in a column design linked to the kinetics and thermodynamics of these reactions, that is:

utilization of a high number of plates, to obtain stratification of the acid concentrations, which favors an approach to equilibrium; and utilization of a sufficient gap between the plates to oxidize the NO which is formed.

For this reason, to obtain good efficiency in the range of low concentrations of $NO + NO_2$, hereinafter designated by $NO_x$ (less than 6000 vpm, for example, in a nitric acid plant operating at $4 \times 10^5$ Pa), in which range the kinetics of oxidation of NO are very slow, it has been sought to space the plates farther and farther apart and to select a high ratio R (R=ratio of the column volumn between two successive plates to the volume occupied by the gas-liquid emulsion between these two plates), usually greater than 7 and frequently much higher.

However, the point arrived when, even with very large values of R, the reoxidation of NO to $NO_2$ became negligible; that is, the absorption efficiency of the plates installed tended towards zero, and it became impossible to descend below a certain threshold value of $NO_x$.

This led to U.S. Pat. No. 4,372,935, incorporated by reference herein, corresponding to European Patent Application No. 47191, which discloses a process which enables the $NO_x$ content to be significantly reduced in an industrial apparatus.

U.S. Pat. No. 4,372,935 states that when the partial pressure of the $NO_x$ in the gas is low, for example less than 6000 vpm under $4 \times 10^5$ Pa, the overall oxido-absorption phenomenon in dilute nitric acid solutions is limited by a liquid phase reaction, and the conversion of $HNO_2$ to $HNO_3$ then becomes the limiting stage of the process.

The idea of the process disclosed in U.S. Pat. No. 4,372,935 therefore consisted in favoring the disappearance of $HNO_2$ in the liquid phase by its conversion to $HNO_3$, and thereby ran counter to the accepted assumptions and hence appeared as a breakthrough in the art.

Nevertheless, even though a lower threshold of $NO_x$ was obtained, a new limitation appeared which prevented the attainment of very low values of $NO_x$ in the residual gases.

The present invention relates therefore to a process for treating gases which have a low $NO_x$ content which enables the final threshold of $NO_x$ to be lowered to values of 200 vpm or less. The invention also relates to an efficient and economical cell for reoxidation of NO.

The invention also relates to the treatment of any gas containing nitrous vapors, regardless of its origin (composition, flow rate, pressure and the like).

The present invention generally relates to an oxido-reduction process, in a countercurrent gas-liquid contact device, for nitrogen oxides contained in a gas stream also containing oxygen.

The invention provides conditions which favor the conversion of $HNO_2$ to $HNO_3$ in the liquid phase, and which cause an oxidation of the medium. Specifically:

(a) for values of the ratio $NO/NO_2$ greater than 1, the ratio K, which is the ratio of the liquid retention volume in m³ to the flow rate of the gas stream in Nm³/hour, is increased so that the $NO_x$ are preferentially absorbed according to the reaction (2):

$$NO + NO_2 + H_2O \rightarrow 2HNO_2 \text{ (liquid phase);} \qquad (2)$$

(b) oxidation is then induced to reduce the values of the ratio $NO/NO_2$ and to restore the conditions of stage (a); and (c) stage (a) is repeated at least once. If stage (a) is repeated more than once, stage (b) is repeated after all of the repetitions of stage (a) except the last one.

It has in fact been observed that when the ratio $NO/NO_2$ becomes greater than 1, the reaction (2) predominates $$NO + NO_2 + H_2O \rightarrow 2\,HNO_2 \text{ (liquid phase).} \qquad (2)$$

Reaction (2) is favored by increasing the ratio K of the liquid retention volume in m³ to the flow rate of the gas stream in Nm³/hour to deplete the gas in $NO_x$. An oxidation is then induced to decrease the values of the ratio $NO/NO_2$ and to restore the conditions of stage (a).

If the ratio $NO/NO_2$ is initially less than 1, the $NO_x$ content of the gas stream is first lowered in the zone where this content is sufficiently high for the absorption of $NO_x$ according to the following reaction (1) to be predominant:

$$NO_2 + \tfrac{1}{3}H_2O \rightarrow \tfrac{2}{3}HNO_3 + \tfrac{1}{3}NO \text{ (liquid phase).} \qquad (1)$$

The invention may thus be applied to all discharges of nitrous vapor, irrespective of the initial $NO/NO_2$ ratio.

However, the invention is especially applicable to the treatment of a gas in a plate column.

The inventors, during extensive studies, have in fact shown that the operation of a column, in the context of an oxido-reduction of $NO_x$, can be represented by three zones (see FIG. 1).

In zone I, the operating conditions are such that the speed of oxidation is sufficient in the gaseous phase to maintain an $NO/NO_2$ ratio such that the absorption according to equation (1) is predominant.

In practice, this corresponds to a stage during which the $NO_x$ content of the gas stream is lowered, by any known means and in a simple manner, by favoring the oxidation of NO to $NO_2$ in the gaseous phase between the plates and the absorption of $NO_2$ on the plates.

In this zone, the column efficiency does not correspond closely to the value of the ratio K.

In zone II, in contrast, the system $NO_x$, $NO/NO_2$ is such that the absorption reaction (2) is predominant and that the oxidation in the gaseous phase slows down. $NO_x$ decreases more and more slowly, and $NO_2$ is not replaced. $HNO_2$ tends to disproportionate (convert) according to the equation (3):

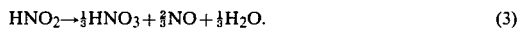
(3)

Stage (a) of the process will hence consist in taking advantage of the characteristics of this zone II, improving the oxido-absorption in the liquid phase to avoid the reaction (3), and therefore the release of NO, and limiting the rate of increase of the $NO/NO_2$ ratio.

The value of K is therefore increased to ensure the direct oxidation of $HNO_2$ to $HNO_3$, according to the reaction (4)

$$HNO_2 + \tfrac{1}{2}O_2 \rightarrow HNO_3 \qquad (4)$$

at the expense of reaction (3).

Values of K may in particular be used which correspond to those given in U.S. Pat. No. 4,372,935, i.e., K is greater than $5 \times 10^{-4}$ hour for an $NO_x$ content in the gas stream of 6000 vpm, and K is greater than $3.5 \times 10^{-4}$ hour for 2500 vpm.

During the absorption, the $NO/NO_2$ ratio continues to increase and the rate of absorption, according to reaction (2), becomes very low.

At the entry into zone III, the increase in the value of K no longer permits the $NO_x$ content to be substantially lowered.

To achieve a further lowering of the $NO_x$ content, there is provided a restoration, during stage (c), of the conditions of stage (a) by means of stage (b) wherein the $NO/NO_2$ ratio is lowered by oxidation.

FIG. 1 shows schematically and qualitatively the operation of a column according to the invention.

Point $A_0$ indicates the starting point in stage (a). This stage is carried out up to point $A_1$ by any known conventional means. Point $A_1$ marks the practical limit of operation of such a column.

The value of K is then raised to increase the residence time of the aqueous solution in the corresponding part of the device (or column).

The operation in stage (a) is described by the curve $A_0A_2$. The effectiveness of stage (a) is greatly diminished at the approach ($A_2$) to zone III. At this time, an oxidation stage is established which takes the operating point back to $B_1$.

It is then possible to increase again the residence time of the aqueous solution by varying the value of K and thus repeat stage (a), as described by the curve $B_1A_3$.

Unexpectedly, the stages (a) and (b) may be repeated more than once, as represented by FIG. 1 in the loop $A_3B_2A_4$.

Very obviously, stopping before the maximum depletion in stage (a), for example by stopping at $A_j$, and establishing an oxidation stage to take the operating point back to $B_j$, is within the scope of the invention.

According to the invention, it is necessary to avoid the condition of zone III. A simple means of achieving this goal consists in inducing an oxidation of the medium.

By virtue of the combination of the stages of the process of the invention, this absorption of $NO_x$ can be accomplished economically. By carrying out stage (a), the volume of the absorption devices can be reduced. The fact that oxidation is used only in stage (b) permits a very limited quantity of oxidizing agent to be employed.

The oxidizing agents used in stage (b) can be, for example, hydrogen peroxide, nitric acid, or a mixture of these two.

These oxidizing agents can be introduced, for example, by spraying on a plate and/or by means of a recirculation loop.

In the case where reoxidation is accomplished by nitric acid, according to the invention, the NO can be reoxidized to $NO_2$ without substantially increasing the overall content of $NO_x$, in contrast to the prediction of reaction (1), by employing a combination of a spraying stage followed by an oxido-absorption stage, according to the description in European Patent Application No. 47,191, which corresponds to U.S. Pat. No. 4,372,935 and which is incorporated by reference herein.

The oxidation of nitrogen oxides by hydrogen peroxide has not hitherto been used on an industrial scale, since the techniques proposed led to a prohibitive consumption of $H_2O_2$.

The process of the invention overcomes this disadvantage by applying very precise conditions for using the hydrogen peroxide.

The inventors' studies have, in fact, demonstrated that an appropriate hydrogen peroxide, nitric acid system may be used to obtain the maximum conversion of NO to $HNO_3$.

As can be seen in FIG. 2, it is possible for hydrogen peroxide to be ineffective from the point of view of this conversion.

In FIG. 2, V represents the $H_2O_2$ concentration by volume and N represents the normality of the nitric acid solution of $H_2O_2$.

$C_1$ is the curve which shows a threshold value of N corresponding to each value of V.

$C_2$ is the curve which shows the appearance of $NO_2$ in the gaseous phase.

In zone A, below the curve $C_1$, the only possible action of the hydrogen peroxide is that which relates to the reaction,

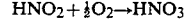

but there is no oxidation of NO to $NO_2$ and, furthermore, there is inhibition in the rate of oxido-absorption of NO by $HNO_3$.

In zone B, situated above the curve $C_1$ and above $C_2$, NO is surface oxidized by $HNO_3$, and $HNO_2$ is formed and completely oxidized to $HNO_3$.

In zone C, $NO_2$ is released. The higher the normality of the nitric acid solution, the more closely the equilibrium of oxidation of NO by $HNO_3$ is approached, but not reached. The system behaves as if the $HNO_2$ formed decomposes before having had time to be oxidized.

It is therefore necessary to operate in the zone B to optimize the use of hydrogen peroxide.

Thus, the present invention permits a significant increase in the efficiency of a treatment with $H_2O_2$.

A convenient method consists in introducing the oxidizing agent, for example an $HNO_3/H_2O_2$ mixture, by spraying it between two plates operating according to stage (b), either directly or by way of a recirculation loop.

Advantageously, in the first case, the spraying should be carried out in such a way that the drops of the mixture have reacted before they reach the emulsion on the plate below.

In the second case with recirculation, the overflow from the corresponding plate, which overflow is isolated specifically for this operation, will be injected several plates lower down, so that the residual hydrogen peroxide reappears on a plate having a higher nitric acid concentration and is removed from the inhibition curve.

However, the present invention will be more readily understood by means of the following examples, which are given by way of illustration and are in no way limiting.

Figure 3:
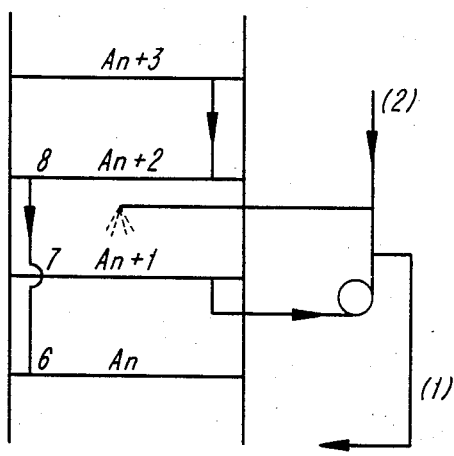
Figure 4:
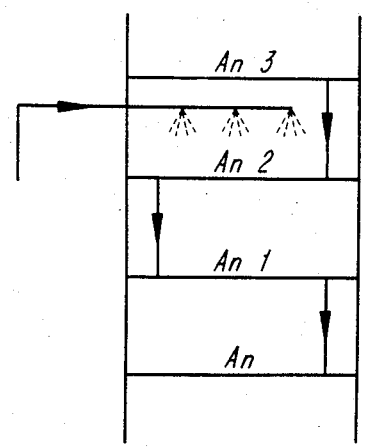

FIGS. 3 and 4 give two examples of an embodiment, with introduction of an $H_2O_2/HNO_3$ mixture, according to the invention, by spraying, in which An, An+1, An+2 and An+3 represent the plates of an oxidoabsorption column, with, in FIG. 3, reinjection occurring upstream according to (1).

To demonstrate the advantages of the present invention, a treatment was carried out in comparative fashion with the following:
- a convention device of the type described in French Patent No. 1,255,373
- a device according to European Patent Application No. 47,191
- a device making use of the invention, either with an oxidation stage by $HNO_3$ or with an $HNO_3$ stage $+H_2O_2$ stage.

The operating conditions are as follows:

| | |
|---|---|
| pressure: $4 \times 10^5$ Pa | |
| temperature: 30° C. | |
| gas to be treated: | (1) $NO_x$ content = 1200 vpm |
| (from a standard | (2) oxygen content = 3.5% by |
| nitric acid plant) | volume |
| | (3) $NO/NO_2$ ratio = 2 |

The gases circulate from bottom to top in a cyclindrical column 13 m high, equipped with 13 perforated plates 1 m apart, and of diameter such that the true speed of the gases is 0.23 m/s.

The process water is introduced at the top of the column; it emerges from the bottom of the column with an acid content according to the $NO_x$ recovered (1 to 3%); the flow rate is such that the water/gas ratio, expressed in liter/$Nm^3$, is 0.11.

The table below enables the equivalent performances and consumptions of the various devices to be compared, the capital investment in each device being almost identical.

Whereas the conventional device does not permit better than 1000 vpm of $NO_x$ to be attained, the present invention enables this content to be lowered to 660 vpm without using hydrogen peroxide, and to 210 vpm (or less) using hydrogen peroxide.

Figure 5:
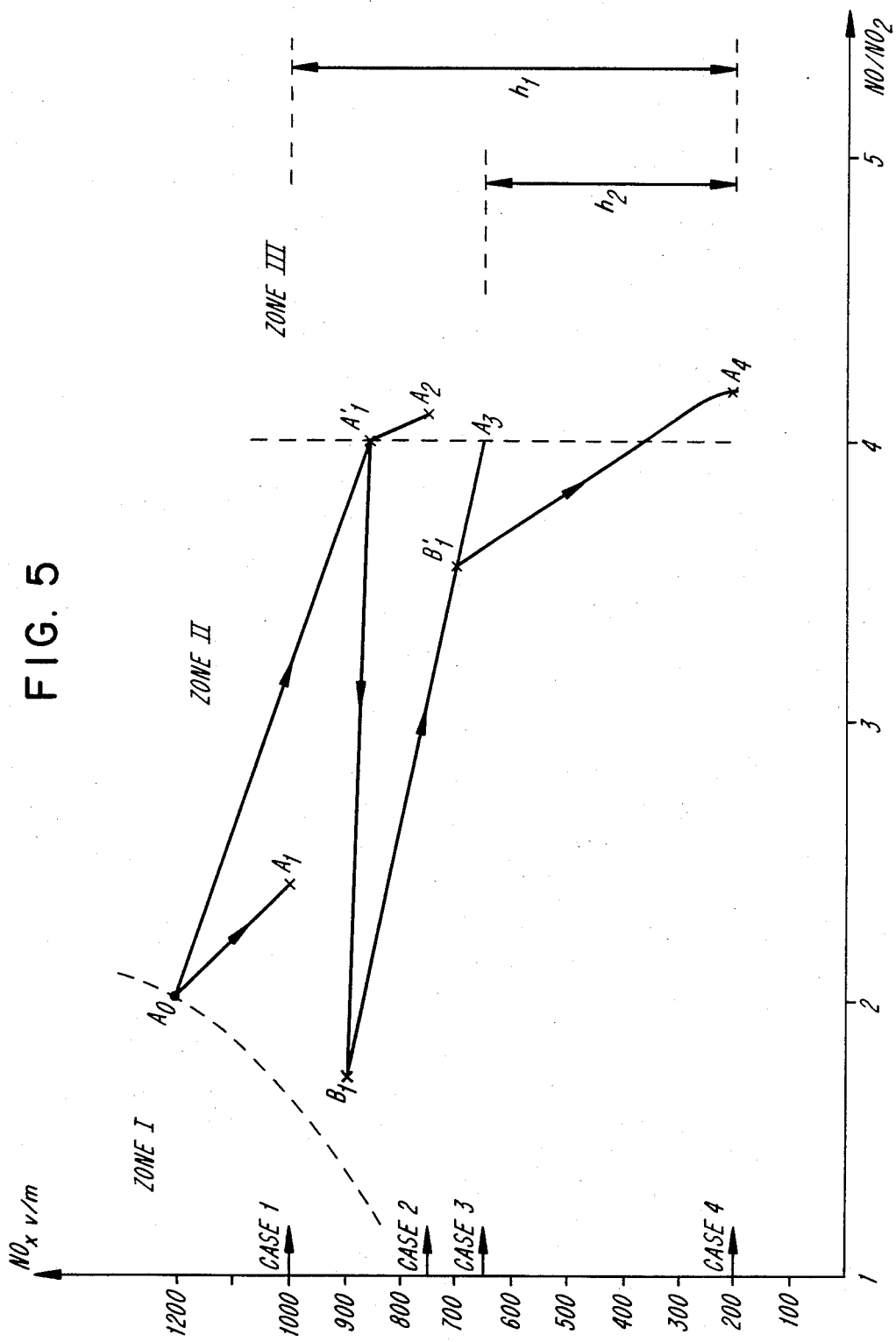

These results will be more readily understood by reference to the graph $NO_x = f(NO/NO_2)$ in FIG. 5, since the optimization of a purification cell for $NO_x$ dictates the correct "situation" of the gas to be treated, relative to the three zones described above.

The point $A_0$ ($NO_x = 1200$, $NO/NO_2 = 2$) corresponds to the initial gas.

The general principles, which have been derived from the numerous experiments carried out, permit the following conclusions to be drawn, under the above operating conditions:
- the point $A_0$ is in practice on the line of separation of the zones I and II, that is to say, a good absorption efficiency will only be obtainable by favoring the oxidation of $HNO_2$ in the liquid phase (stage a)
- the line of separation of the zones II and III is in practice the vertical $NO/NO_2 = 4$.

The conversion of the gas is then followed according to the devices used.

CASE NO. 1

The conventional technology, corresponding to a very low coefficient K, favors the oxidation in the gas phase at the expense of the oxidation in the liquid phase. Since the kinetics of oxidation in the gas phase become very slow, the overall efficiency is low. Point $A_1$ is finally arrived at, with a low $NO/NO_2$ ratio.

CASE NO. 2

The technology making use of the process according to European Patent Application No. 47,191 corresponds, in contrast, to a much larger coefficient K. This technology favors the oxidation of $HNO_2$ in the liquid medium, and thus permits the point $A_2$ to be reached, corresponding to an $NO/NO_2$ ratio slightly greater than 4.

The measurement of the system ($NO_x$, $NO/NO_2$), at various points in the column permits the tracing of the line $A_0$, $A'_1$, $A_2$ which represents the conversion of the gas. It is observed that:
- the point $A'_1$, situated on the frontier line between the zones II and III, is reached when leaving the 6th plate.
- The line $A_0A'_1$ corresponds exactly to stage (a) described above; this line is situated to the right of the line $A_0A_1$ which is explained by the fact that, on the one hand the depletion in $NO_2$ is faster (K larger), and on the other hand there is less oxidation in the gas phase (R smaller and 6 plates instead of 13).
- Beyond the point $A'_1$, the zone III is entered where the limiting rate is that of the oxidation in the gas phase, the efficiency becomes very low since it requires 7 plates to pass from $A'_1$ to $A_2$.

This leads to the application of the present invention, which consists in returning from $A'_1$ into the zone II which can be accomplished by an oxidation (stage b).

CASE NO. 3

Oxidation by $HNO_3$:

A loop is established for the recirculation (1) of nitric acid, of normality 4N, according to the diagram in FIG. 3, on plate No. 7 (An+1), the acid from plate 8 (An+2) being set directly on to plate 6 (An), and the nitric acid being introduced at (2).

Under these conditions, the representing line becomes $A_0$, $A'_1$, $B_1$, $A_3$.

efficiency by partially removing the $HNO_2$ dissolved in the acid.

| | COMPARISON OF THE PERFORMANCE OF THE VARIOUS DEVICES FOR A COLUMN OF THE SAME VALUE, EQUIPPED WITH THE SAME NUMBER OF PLATES | | | |
|---|---|---|---|---|
| CASE | 1 Column according to French Patent No. 1,255,373 | 2 Column according to European Patent Application No. 47,191 | 3 Column according to invention (1 $HNO_3$ oxidation stage) | 4 Column according to invention (1 $HNO_3$ stage + 1 $H_2O_2$ stage) |
| INTERNAL TECHNOLOGY | | | | |
| Number of plates | 13 | 13 | 13 | 13 |
| R | 10 | 2.2 | 2.2 | 2.2 |
| $10^4$ K (hour) | 1.4 | 6.3 | 6.3 | 6.3 |
| Reoxidation plates | 0 | 0 | 1 | 2 |
| $NO_x$ inflow | | | | |
| Vpm | 1200 | 1200 | 1200 | 1200 |
| $NO/NO_2$ (mole ratio) | 2 | 2 | 2 | 2 |
| $NO_x$ outflow | | | | |
| Vpm | 1000 | 750 | 660 | 210 |
| $NO/NO_2$ | 2.4 | 4.1 | 4 | 4.2 |
| Efficiency $\frac{NO_x(in) - NO_x(out)}{NO_x(in)}$ | 0.154 | 0.375 | 0.450 | 0.825 |
| Pressure drop in Pa | 10,000 | 25,000 | 24,000 | 24,000 |
| $H_2O_2$ equivalent consumption (1) | | | | $30 \times 10^{-5}$ |

(1) Expressed in $Nm^3$ of oxygen per $Nm^3$ of gas to be treated
R = ratio of column volume between two successive plates to volume occupied by the gas-liquid emulsion between these successive plates.

The reoxidation loop reduces the $NO/NO_2$ ratio without substantially increasing $NO_x$ (line $A'_1$, $B_1$) and stage (a) takes place again on plates 8 to 13 (line $B_1A_3$).

It is hence possible, according to the invention, to add an oxidation stage to further lower the final threshold, describing the line $A_3B_2A_4$ (FIG. 1), but this solution implies the addition of a few absorption stages, whereas this result can be attained without investing in a supplementary column volume, by adding, according to Case No. 4, a final stage with oxidation by $H_2O_2$.

CASE NO. 4

Oxidation by $HNO_3$ and $H_2O_2$:

Using again the device of Case No. 3, a loop for reoxidation by $H_2O_2$ is incorporated at the level of plate 12, according to FIG. 4; the line representing the conversion of the gas in the column then becomes:

| | |
|---|---|
| $A_0A'_1$ (stage a) | from plate 1 to plate 6 |
| $A'_1B_1$ (stage b) | on plate 7 |
| $B_1B'_1$ (stage a) | from plate 7 to plate 11 |
| $B'_1A_4$ | on plates 12 and 13. |

The volume available is thus used to the best advantage, while the quantity of $H_2O_2$ used is minimized, this quantity being proportional to the difference between the ordinates of $A_4$ and $A_3$ ($h_2$) (whereas when using hydrogen peroxide in a conventional column, and allowing that the conditions permit the point $A_4$ to be reached, which is not obvious, the quantity consumed would have been proportional to the ordinate of $A_1A_4$ [equivalent to $h_1$]).

As stated above, the use of hydrogen peroxide should be such that, on the one hand there is no blocking of the oxidation of NO by $HNO_3$, and on the other hand the quantity removed by the purge is minimal; that is, in the present case, the recirculating mixture is composed of nitric acid of strength 4N and hydrogen peroxide at strength 4 volumes. The purge is sent back into the recirculation loop from plate 7, thereby improving its efficiency by partially removing the $HNO_2$ dissolved in the acid.

We claim:

1. An oxidation-reduction process for the removal of nitrogen oxides, $NO_x$, contrained in a gas stream additionally containing oxygen, comprising the step of countercurrently oxidizing and absorbing said gas stream in aqueous solution in a gas-liquid contact device, wherein in that section of said gas-liquid contact device where the $NO_x$ content in the gas stream is less than about 6000 vpm, said process further comprises the steps of (a) increasing for values of the ratio $NO/NO_2$ greater than 1, the ratio K, which is the ratio of the liquid retention volume in $m^3$ to the flow rate of the gas stream in $Nm^3$/hour, so that the $NO_x$ are preferentially absorbed according to the reaction:

$NO + NO_2 + H_2O \rightarrow 2HNO_2$ (liquid phase)

(b) then incorporationg as oxidizing agents nitric acid and hydrogen peroxide, said hydrogen peroxide being incorporated such that, with reference to FIG. 2 of the drawing, the representative point of hydrogen peroxide concentration (V) by volume relative to the normality (n) of the resultant nitric acid solution containing hydrogen peroxide is situated in zone (B) above curve (C1), showing a threshold value of (N) corresoonding to each value of (V), and above curve (C2) which represents the appearance of $NO_2$ in the gaseous phase and inducing oxidation to reduce the value of the ratio $NO/NO_2$ and to restore the conditions of steo (a), wherein in steps (a) and (b), the residence time of the aqueous solution is increased to a value such that said ratio K is greater than $5 \times 10^{-4}$ hour for 6000 vpm; and (c) repeating step (a) at least once.

2. The process of claim 1, wherein step (c) is repeated more than once and step (b) is repeated after all of the repetitions of stage (c) except the last one.

3. The process of claim 1, wherein, prior to step (a), for $NO/NO_2$ values less than 1, the process further comprises the step of lowering the $NO_x$ content of the gas stream by absorption of the $NO_2$ in the liquid phase to raise the value of the $NO/NO_2$ ratio to greater than one.

4. The process of claim 1, wherein said gas-liquid contact device is an oxidation-absorption column.

5. The process of claim 4, wherein the oxidation in the gaseous phase is preferentially obtained between the plates, and the absorption of $NO_2$ is preferentially obtained on the plates.

6. The process of claim 1, wherein the oxidizing agents are introduced by spraying.

7. The process of claim 1, wherein the oxidizing agents are introduced by way of a recirculation loop.

* * * * *